United States Patent Office 3,375,203
Patented Mar. 26, 1968

3,375,203
URANIUM OXIDE SOLS
Forrest R. Hurley, 9 Font Hill Drive, Ellicott City, Md. 21043; Melvin Tecotzky, 570 Oxford Ave., Apt. E, Palo Alto, Calif. 94306; and Milton Charles Vanik, 18 Windward Drive, Severna Park, Md. 21146
No Drawing. Continuation-in-part of application Ser. No. 290,170, June 24, 1963, which is a continuation-in-part of application Ser. No. 1,159, Jan. 8, 1960. This application June 20, 1966, Ser. No. 558,616
4 Claims. (Cl. 252—301.1)

ABSTRACT OF THE DISCLOSURE

Sols of uranium dioxide composed of particles in the size range of 60 to 1900 Angstrom units, having a pH between 1 to 5 and a specific conductivity of $10^{-5}$ to $10^{-2}$ mhos per centimeter.

This application is a continuation-in-part of application Ser. No. 290,170, filed June 24, 1963, now abandoned, which is a continuation-in-part of application Ser. No. 1,159, filed Jan. 8, 1960, now abandoned.

This invention relates to stable urania sols and to methods of preparing these sols. In one specific aspect it relates to a urania sol which can be encapsulated and used in an aqueous homogeneous reactor or can be used in certain ceramic applications. By urania sols, we mean sols of uranium dioxide.

The compound $UO_2$ has a fluorite crystal structure. When the $UO_2$ adsorbs oxygen the fluorite structure is stable until the composition reaches approximately $UO_{2.3}$ (the fluorite structure is reportedly also stable down to the composition $UO_{1.75}$). Uranium dioxide when heated in air will transform to $U_3O_8$. Above $UO_{2.3}$ the fluorite structure breaks down. The volume expansion of the $UO_2$ transforming to $U_3O_8$ may cause certain difficulty especially when the uranium dioxide is being used as the fuel source in a reactor.

The utility of urania sols in nuclear fuel development has been well established. These sols have use in the preparation of ceramic fuel elements as well as in the preparation of fuels for nuclear homogeneous reactors. These sols are also frequently used as one of the components of mixed sols with other compositions such as the rare earths, zirconia, etc. Urania sols may be mixed with ceramic powders, especially those of zirconia and yttria to prepare ceramics with improved properties of strength and grain growth control.

We have found it is now possible to prepare urania (uranium dioxide) sols with a suitable urania content, free from undesirable neutron capturing components, suitable for the uses outlined above. The particles or micelles of the urania sols prepared in accordance with the present invention are of such small size that there is only slight tendency to settle and attrition is not a problem.

For use in aqueous homogeneous reactors, we prefer to coat or clad these sols with silica to improve their hydrothermal stability. The preferred process of coating or cladding comprises the addition of a layer of reactive silica to the sol particles followed by deactivation by treating under non-evaporative conditions, either in an autoclave or under total reflux, and stabilizing by the addition of an alkali metal hydroxide. The urania sols clad with silica according to this process are particularly desirable in that the silica and alkali metal have low neutron capture cross-sections and thus are not a factor in neutron economy. However, in order to obtain the desired characteristics, the urania sol cladding step should be carried out in a carefully controlled manner and under carefully controlled conditions.

Sols of the present invention are composed of urania particles that, from electron microscope studies generally take the form of cubes, although some are roughly spherical. These particles frequently evidence a substructure composed of small cubes packed in a cubic array.

The particle size range of these sols is about 60 to 1900 Angstroms. However, the particles are of generally uniform size and very few fall outside the range of 200 to 600 Angstroms. The particles are in the appropriate size to exhibit colloidal properties.

In the present process, we start with an aqueous solution of a uranium (IV) salt which is sufficiently soluble so that 5 to 10% equivalent $UO_2$ sols can be prepared. Uranium (IV) nitrate and uranium (IV) chloride have been considered for this purpose. Uranium (IV) chloride gives satisfactory results. Uranium (IV) nitrate is not as satisfactory because of a tendency of the nitrate ion to oxidize the uranium (IV) ions to uranyl ions. The uranium (IV) chloride is better suited for this purpose because uranium (IV) in the presence of chloride ion is stable in solution.

The urania sols of our invention are characterized by relatively dense particles having colloidal dimensions and exhibiting no tendency to agglomerate at ambient temperatures. Prolonged heating of these particles may, under certain conditions, cause them to accrete with the result that they are not sufficiently stable to hydrothermal treatment. This problem can be solved by cladding the sol micelles with silica. The silica cladding, as stated previously, renders the particles stable enough to be used as fuels in aqueous homogeneous reactors. As verified by electron microscopy, a coating of about 30 to about 120 Angstroms thick can be deposited on the particles using the techniques set out in Example V.

The halogen content of these sols can be reduced to a low value by treatment of the sols with a mixed bed ion exchange resin under appropriate conditions. A urania sol prepared as described can be concentrated by evaporation to a solids content of at least 17% It is preferred to add fresh sol continuously during the evaporation to avoid deposition of the solid material on the sides of the vessel. Concentration to still higher solids content can be effected by centrifuging the sols, removing the solids and redispersing them in a smaller volume of water. This technique is also useful when it is desired to change the solution medium from regular water to heavy water. Sols clad with silica can be concentrated to even higher solids content then the unclad sols. The finished sol may be diluted to any lower solids content by addition of deionized water or water of low ionic content.

Sols, when subject to aging or certain types of heat treatment, undergo a densification in which the open gel structure is altered and the density of the individual particles is increased. Densification of the urania particles is obtained by controlling conditions during the formation of the sol or, to some extent, by subsequent treatment. The maximum concentration of urania which may be obtained in the sol is primarily dependent on its pH, particle shape and size distribution, particle density and, when the sol is clad, the urania to silica ratio.

Since the sols of this type tend to coagulate on the addition of electrolytes, care must be taken to keep the electrolyte content at a minimum. A convenient method of measuring concentration of the undesired ionic material is conductivity. For the sols of the present invention, conductivity will usually range between $10^{-5}$ and $10^{-2}$ mhos/cm. The stability of any given sol is improved by reduction in the electrolyte content. Therefore, conductivities in the lower part of the range are preferred. The sols have a pH in the range of 1.0 to 5.0, preferably 2.5 to 4.0.

Conductivity is measured at 25° C. and one kilocycle using a standard conductivity bridge with a cell inserted in one arm. The cell constant is determined using KCl solutions of 0.01 to 0.02 normality (the conductivity of which is ascertained from the conductivity tables) and using the equation:

$$K = L_{KCl} R$$

where:

$K$ = the cell constant in cm.$^{-1}$
$R$ = bridge resistance in ohms
$L$ = conductance in mhos/cm. of the standard KCl solution The conductance L of the sol in question can be determined by measuring its resistance in the same cell and using the equation:

$$L \text{ sol} = \frac{K}{R}$$

where:

$K$ = cell constant
$R$ = resistance in ohms.

The viscosity of the sols is determined with an Ostwald viscometer. The viscometer is kept in a constant temperature bath at 25° C. and a 10 ml. sample is used in the viscosity studies. The relative viscosity of a sol can be determined by using water as the standard and assuming the viscosity of water is 1. The viscosity is then calculated using the formula:

$$\frac{n_1}{n_2} = \frac{d_1 t_1}{d_2 t_2}$$

where:

$n_1$ = the relative viscosity of the sol
$n_2$ = 1 (viscosity of water)
$d_1$ = the density of the sol at 25° C.
$t_1$ = the time of flow in seconds of the sol in the viscometer
$d_2$ = 0.997 (the density of water at 25° C.)
$t_2$ = the time of flow in seconds of water in the viscometer After the relative viscosity has been determined, the absolute viscosity in poises can be obtained by multiplying the relative viscosity by the absolute viscosity of water at 25° C. This value is 0.00895 poises.

In referring to our dispersions of urania in water, we mean to include heavy water as well as natural water. In referring to our dispersions of urania, we intend to include U-233 and U-235 as well as natural uranium which is principally U-238. Our definition of the term "urania" covers only uranium dioxide $UO_{1.75-2.3}$.

The present invention will be further explained by the following illustrative but non-limiting examples.

*Example I*

A series of runs were completed in which a urania sol was prepared from a nominal 1% uranium salt solution.

In a typical member of this series, 3505 ml. of UCl$_4$ solution containing 7.73 grams of uranium was charged into a heated vessel for use in preparing a urania sol designated in this specification as a densification vessel. The solution was circulated at a rate of approximately 150 cc./min. to the cathode compartment of a cell separated by an ion exchange resin membrane of Nepton AR-111A. The electrode compartments each had a capacity of approximately 350 ml. and each was equipped with a stirrer. Platinum electrodes were positioned on each side of the membrane a distance of 1/8" from the membrane. The temperature in the densification vessel was maintained at about 80° C. Uranium chloride solution was withdrawn from the densification vessel at the rate of about 150 cc./min. through a cooled heat exchanger and pumped into the above described cell. The temperature of the incoming solution was controlled to maintain a cell temperature of about 18 to 27° C. The solution leaving the cell was passed through a heat exchanger where it was heated to about 80° C. and then returned to the densification vessel. Evaporation losses were minimized by equipping the cell with a condenser and periodically adding deionized water to take care of unavoidable losses. Circulation was continued for a period of 9 hours. During electrodialysis the amperage dropped from about 10.3 to a value of about 0.2 and the pH rose from a value to about 0.5 to about 3.9.

The sol had a density of 1.003 grams/ml., a specific conductance of $1.36 \times 10^{-4}$ mhos/cm. and contained 7.37 grams of uranium per liter. A sample of the product was submitted for X-ray analysis. The X-ray diffraction pattern of the particles making up this sol (after drying) showed the following two lines:

| $d$: | $I/I°$ |
|---|---|
| 3.13 | 100 |
| 2.71 | 29–39 |

The "particle" size ranged from about 60 to about 700 Angstrom units, but most of the particles were in the size range from 350 to 535 Angstroms. Only the very smallest particles departed from the generally spheroidal form. The data for the other four runs in this series is summarized in Table I and II below.

TABLE I

| Run | Sol Concentration | | Density | Final pH | Specific Conductance | Viscosity | |
|---|---|---|---|---|---|---|---|
| | U | Cl | | | | Relative to H$_2$O | Absolute |
| 1 | 5.74 | 0.071 | 1.0025 | 3.7 | 0.00042 | 1.0021 | 0.00897 |
| 2 | 5.84 | 0.071 | 1.0020 | 3.43 | 0.000485 | 0.9966 | 0.00892 |
| 3 | 6.73 | 0.071 | 1.0090 | 3.52 | 0.000468 | 1.0187 | 0.00912 |
| 4 | 6.30 | 0.11 | 1.0090 | 3.36 | 0.00657 | 1.0063 | 0.00901 |

Concentration is given in grams per liter and density in grams per milliliter. Specific conductance in mhos per centimeter and absolute viscosity in poises. These materials after drying showed the two principal lines of the fluorite structure.

TABLE II

| Run | Amperage | | Cell Temp. | Time | Pot Temp. | Specific Conductance of Sol |
|---|---|---|---|---|---|---|
| | At Start | On Completion | | | | |
| 1 | 10.2 | 0.6 | 27 | 6¼ | 80 | 3.4×10$^{-4}$ |
| 2 | 2.7 | 0.5 | 25.2 | 9 | 80 | 3.3×10$^{-4}$ |
| 3 | 10 | 0.2 | 18–26 | 9 | 60 | 4.7×10$^{-4}$ |
| 4 | 9.8 | 0.25 | 22.5–27 | 11 | 100 | 3.89×10$^{-4}$ |

Temperature is given in ° C., time in hours and conductance in mhos per centimeter.

It is apparent from these data that a satisfactory urania sol can be prepared from a nominal 1% uranium solution.

*Example II*

Two runs were completed in which a urania sol was prepared from a nominal 5% uranium as a nitrate solution. In a typical member of this series, the uranyl nitrate (uranium in the plus VI oxidation state) was reduced to uranium (IV) and converted to the chloride.

A charge of 450 grams of uranyl nitrate hydrate was dissolved in 4 liters of deionized water. This solution was charged into a heated densification vessel maintained at 100° C. for the preparation of a urania sol. The solution was circulated at a rate of approximately 150 cc./min. to the cathode compartment of a cell separated by an ion exchange resin membrane of Nepton AR–111A. The electrode compartments each had a capacity of approximately 350 ml. and each was equipped with a stirrer. Platinum electrodes were positioned on each side of the membrane a distance of ⅛″ from the membrane. The temperature in the densification vessel was maintained at about 100° C. Hydrochloric acid was added to the solution during electrodialysis to replace the nitrate ion removed by chloride ion. As electrodialysis continued, the uranyl ion was reduced to uranium (IV) and the chloride ion was removed. Circulation was continued for a period of 9 hours. During electrodialysis, the amperage dropped from 10 to a value of about 0.7 and the pH rose from about 0.4 to 3.7. The sol had a density of 1.033 grams/ml. The size of the urania particles in the sol ranged from 200 to 1700 Angstroms. These particles which were approximate spheres, showed some cubic characteristics. Other data collected in this and the other runs in this series are presented in Tables III and IV A portion of urania sol containing about 5% $UO_2$ and having a pH of 3.4 was heated for 24 hours at 150° C. At the end of this period the contents of the tube were examined. No noticeable change was apparent in the physical properties of the sol. A portion of the same sol was clad with silica according to the method set out in Example V except that due to electrical failure the temperature dropped during the overnight refluxing of the urania particles with the silica sol. The product sol was treated with an ion exchange resin and examined in the electron microscope. The electron micrograph indicated that the particles were only partially clad, that is, the coating was thin on several of the urania particles and about 20 to 40% were not clad with silica. The pH of this poorly clad sol was 7.1. This portion was transferred to a Vycor tube and heated at 300° C. to determine its hydrothermal stability. The run was stopped after 65 hours and the condition of the contents of the tube noted. The sol had definitely begun to show signs of failure at this point. The heating was continued for an additional period of 155 hours. On examination of the sol at that time, it was apparent that the sol had lost its fluidity and turned into a hydrogel.

Another sol was clad with silica using the method described in Example V. This sample contained 7.5% $UO_2$ and had a pH of 7.1. The sample was heated to 300° C. for 300 hours. At the end of this period the autoclave was opened and the sample examined. The sample was still fluid and contained very little sludge indicating no breakdown of the sol during heat treatment.

It is apparent from these data that a properly silica clad sol was stable at a higher temperature for a much longer period of time, and that cladding the sols with silica definitely improves their hydrothermal stability.

TABLE III

| Run | Sol Concentration | | Density | Final pH | Specific Conductance | Viscosity | |
| --- | --- | --- | --- | --- | --- | --- | --- |
| | U | Cl | | | | Relative to $H_2O$ | Absolute |
| 1 | 34.0 | 0.11 | 1.0330 | 3.7 | 0.000445 | 1.0274 | 0.00919 |
| 2 | 43.0 | 0.16 | 1.0427 | 3.4 | 0.000594 | 1.1099 | 0.00993 |

Concentration is given in grams per liter and densities in grams per milliliter. Specific conductance in mhos per centimeter and the absolute viscosity in poises.

TABLE IV

| Run | Amperage | | Cell Temp. | Time | Pot Temp. | U Conc. | Specific Conductance of Sol |
| --- | --- | --- | --- | --- | --- | --- | --- |
| | At Start | On Completion | | | | | |
| 1 | 10 | 0.7 | 26–34 | 12 | 100 | 3.44 | 3.31×10⁻⁴ |
| 2 | 10.5 | 0.7 | 28–34 | 10¾ | 80 | 4.3 | 6.11×10⁻⁴ |

Temperatures are given in degrees centigrade, time in hours, the uranium concentration in grams per liter and the specific conductance in mhos per centimeter.

*Example III*

One run was completed in which a urania sol was prepared from a nominal 10% uranium salt solution. In this run a uranium (IV) chloride solution was treated in the electrodialysis cell using the techniques described in Examples I and II. The solution was electrodialyzed for 24 hours without interruption. The amperage at the beginning of the run was 8.4 and dropped slowly during the run to a final value of 1.2. The temperature in the densification vessel was maintained at 80° C. and the cell temperature at 26 to 30° C. during the run. The finished sol contained 62.4 grams uranium per liter, its pH was 2.93, its specific conductance 1.193×10⁻³ mhos/cm., and its absolute viscosity 0.0115 poises.

*Example IV*

The hydrothermal stability of these sols was determined and compared with the hydrothermal stability of a comparable sol after coating with silica by subjecting portions of typical members of the group to heat treatment as coated and uncoated sols.

*Example V*

Briefly, the method of coating the urania particles comprises reacting the urania sol with a silica sol. In a typical run a silica sol containing 2% $SiO_2$ was prepared by passing a sodium silicate solution through a column containing Dowex 50 cation exchange resin in the hydrogen form.

The sol to be clad was heated to 40° C. with stirring, then the silica sol was added rapidly with good mixing. The pH of the mixed sol dropped on the addition of the silica sol. The solution was then adjusted to a pH of 9 by the dropwise addition of 1 normal sodium hydroxide. The weight ratio of $UO_2$ to $SiO_2$ in the cladding operation was 2.2 to 1. The mixed sol was refluxed overnight with stirring and after cooling was passed through a mixed bed ion exchange resin and deionized. The pH of the sol was then brought up to 8 by the dropwise addition of 1 normal sodium hydroxide. The clad sols were then placed in a glass pressure vessel and autoclaved at 300° C. for various periods of time in an atmosphere of nitrogen to determine their hydrothermal stability. An electron micrograph of the clad particles showed each particle was coated with a less dense material and that the thickness of the coating was about 30 to 120 Angstroms. Some of the physical and chemical data on these sols is presented in Table V.

TABLE V

| Run | 1 | 2 | 3 | 4 |
|---|---|---|---|---|
| Percent Solids | 17.15 | | 17.15 | |
| Uranium in grams/liter by X-ray spectroscopy | 36.96 | 65.76 | 36.96 | 65.76 |
| pH | 8 | 8 | 8 | 8 |
| Hydrothermal stability at 300° C. stable for at least (hrs.) | 65 | 65 | 200 | 300 |

Obviously, many modifications and variation of the invention as hereinabove set forth may be made without departing from the essence and scope thereof and only such limitations should be applied as are indicated in the appended claims.

What is claimed is:

1. A stable aqueous uranium dioxide sol comprising a homogeneous dispersion in water of spheroidal densified uranium dioxide particles having a particle size in the range of 60 to 1900 Angstrom units, a pH of 1.0 to 5.0 and a specific conductivity of between $10^{-5}$ and $10^{-2}$ mhos.

2. An aqueous uranium dioxide sol having the fluorite crystal structure stable at temperatures up to at least 150° C. comprising a homogeneous dispersion in water of spheroidal densified uranium dioxide particles having a particle size in the range of 60 to 1900 Angstrom units.

3. A stable silica-clad uranium dioxide sol comprising a homogeneous dispersion of uranium dioxide particles in water, said particles being stabilized by sufficient alkali metal hydroxide to give a solution pH of 7 to 10.0.

4. As a composition of matter finely divided spheroidal particles of uranium dioxide having the fluorite structure, said particles having a particle size in the range of 60 to 1900 Angstroms, and having a coating of silica about 30 to 120 Angstroms thick.

References Cited

UNITED STATES PATENTS

| 2,824,784 | 2/1958 | Hansen et al. | 252—301.1 X |
| 2,885,366 | 5/1959 | Iler | 252—313 |
| 3,002,808 | 10/1961 | LaMont | 252—301.1 X |
| 3,097,175 | 7/1963 | Barrett et al. | 252—301.1 X |

OTHER REFERENCES

Weisler: The Hydrous Oxide Sols (1926), p. 293.

CARL Q. QUARFORTH, *Primary Examiner.*

BENJAMIN R. PADGETT, *Examiner.*

L. A. SEBASTIAN, *Assistant Examiner.*